United States Patent
Kobayashi et al.

(10) Patent No.: US 12,508,940 B2
(45) Date of Patent: Dec. 30, 2025

(54) INFORMATION PROCESSING METHOD

(71) Applicant: TOYOTA JIDOSHA KABUSHIKI KAISHA, Toyota (JP)

(72) Inventors: Ryosuke Kobayashi, Nagakute (JP); Koichi Watanabe, Tokyo-to (JP); Motofumi Kamiya, Nagoya (JP); Masaki Nishino, Anjo (JP); Jean-Sebastien Boire, Yokohama (JP); Takuya Nishioka, Nagoya (JP); Yohei Nakanishi, Nagoya (JP); Masaki Makihara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 110 days.

(21) Appl. No.: 18/426,669

(22) Filed: Jan. 30, 2024

(65) Prior Publication Data

US 2024/0278678 A1  Aug. 22, 2024

(30) Foreign Application Priority Data

Feb. 20, 2023 (JP) ................. 2023-024590

(51) Int. Cl.
| | |
|---|---|
| *B60L 53/00* | (2019.01) |
| *B60L 53/57* | (2019.01) |
| *B60L 53/68* | (2019.01) |
| *B60W 60/00* | (2020.01) |

(52) U.S. Cl.
CPC ............. *B60L 53/68* (2019.02); *B60L 53/57* (2019.02); *B60W 60/001* (2020.02); *B60W 2510/244* (2013.01); *B60W 2520/10* (2013.01)

(58) Field of Classification Search
CPC ....... B60L 53/68; B60L 53/57; B60W 60/001; B60W 2510/244; B60W 2520/10
See application file for complete search history.

(56) References Cited

U.S. PATENT DOCUMENTS

| | | | |
|---|---|---|---|
| 2019/0126768 A1 | 5/2019 | Niwa et al. | |
| 2019/0351783 A1 | 11/2019 | Goei | |
| 2022/0065643 A1* | 3/2022 | Madineni | G01C 21/3469 |
| 2023/0356717 A1* | 11/2023 | Shin | B60W 40/076 |
| 2024/0166068 A1* | 5/2024 | La Vigne | B60L 53/302 |

FOREIGN PATENT DOCUMENTS

| | | | | |
|---|---|---|---|---|
| DE | 102018207770 A1 | * | 11/2019 | ............. B60L 50/50 |
| JP | 2014106046 A | * | 6/2014 | ............. G01C 21/26 |
| JP | 2019086841 A | | 6/2019 | |

* cited by examiner

*Primary Examiner* — Russell Frejd
*Assistant Examiner* — Brittany Renee Peko
(74) *Attorney, Agent, or Firm* — KENJA IP LAW PC (57) ABSTRACT

An information processing method performed by an information processing apparatus includes receiving a request for charging that includes information indicating a destination from a user terminal, determining an operation plan of a power supply vehicle that includes transporting a user and a user vehicle toward the destination with supplying power to the user vehicle in response to the request for charging, and transmitting the operation plan to an operator terminal.

3 Claims, 5 Drawing Sheets

INFORMATION PROCESSING METHOD

CROSS-REFERENCE TO RELATED APPLICATION

This application claims priority to Japanese Patent Application No. 2023-024590, filed on Feb. 20, 2023, the entire contents of which are incorporated herein by reference.

TECHNICAL FIELD

The present disclosure relates to an information processing method.

BACKGROUND

Technology for supplying power by a rescue electric vehicle when an electric vehicle uses up electricity and runs out of electricity is disclosed. For example, see Patent Literature (PTL) 1.

CITATION LIST

Patent Literature

PTL 1: JP 2019-086841 A

SUMMARY

When a user vehicle is unable to move due to lack of electricity, the subsequent schedule of the user may be negatively affected (late arrival) because the user cannot move the user vehicle until charging is completed.

It would be helpful to, even after a user vehicle is unable to move due to lack of electricity, reduce possible negative effects on the subsequent schedule of the user.

An information processing method according to an embodiment of the present disclosure is the information processing method performed by an information processing apparatus, the information processing method including:
receiving a request for charging that includes information indicating a destination from a user terminal;
determining an operation plan of a power supply vehicle that includes transporting a user and a user vehicle toward the destination with supplying power to the user vehicle in response to the request for charging; and
transmitting the operation plan to an operator terminal.

According to an embodiment of the present disclosure, even after a user vehicle is unable to move due to lack of electricity, possible negative effects on the subsequent schedule of the user can be reduced.

DETAILED DESCRIPTION

Figure 1:
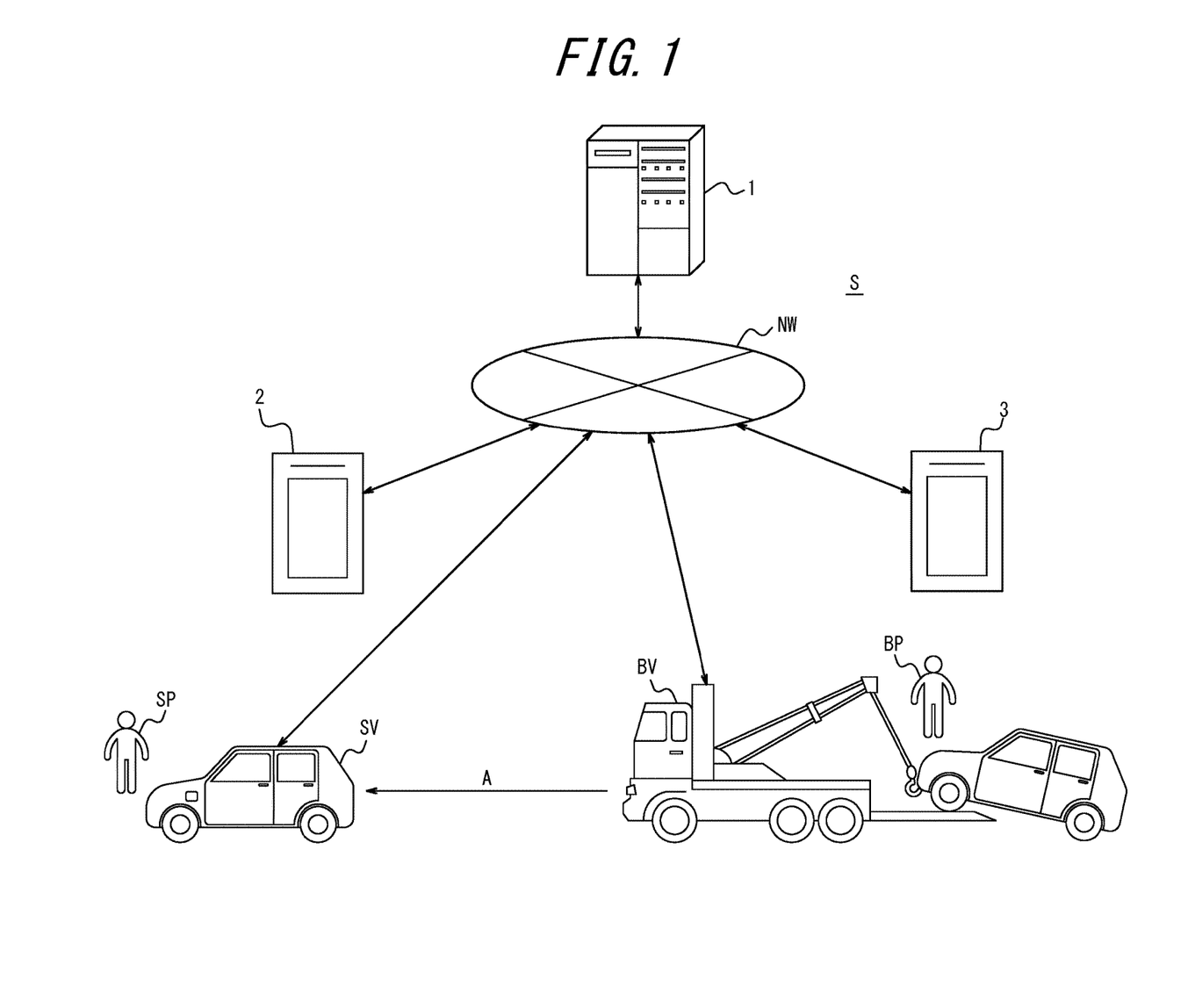
FIG. 1 is a schematic diagram of an information processing system according to the present embodiment.

FIG. 1 is a schematic diagram of an information processing system S according to the present embodiment. The information processing system S includes an information processing apparatus 1, a user terminal 2, an operator terminal 3, a user vehicle SV, and a power supply vehicle BV, which are communicably connected to each other via a network NW. The network NW includes, for example, a mobile communication network, the Internet, or a fixed communication network.

The user terminal 2 is operated by a user SP. User SP drives or rides in a user vehicle SV. The operator terminal 3 is operated by the operator BP. The operator BP drives the power supply vehicle BV or rides in the power supply vehicle BV. The power supply vehicle BV moves to the position of the user vehicle SV as shown in direction A and supplies power from the power supply vehicle BV to the user vehicle SV. As an example here, the user vehicle SV is a Battery Electric Vehicle (BEV) including a battery but is not limited thereto. The power supply vehicle BV can be equipped with both a power-feeding function to supply power to the user vehicle SV and a transportation function to transport the user vehicle SV. In addition, transportation functions may include, but are not limited to, towed and loaded. As an alternative example, the operator BP does not have to board the power supply vehicle BV. As an alternative, the power supply vehicle BV may be operated automatically.

FIG. 1 illustrates one of the information processing apparatus 1, one of the user terminal 2, and one of the operator terminal 3, for convenience of explanation. However, the number of information processing apparatuses 1, the number of user terminals 2, and the number of operator terminals 3 are not limited to one. For example, processing to be executed by the information processing apparatus 1 according to the present embodiment may be executed by a plurality of distributed information processing apparatuses 1. The information processing apparatus 1 may be capable of communicating to multiple user terminals 2 and multiple operator terminals 3.

The information processing apparatus 1 may be a server configured to assist an operational entity in providing a service. The information processing apparatus 1 may be, for example, installed in a facility dedicated to the operational entity or in a shared facility including a data center. As an alternative example, the information processing apparatus 1 may be mounted on the user terminal 2 or the operator terminal 3. The information processing apparatus 1 may be referred to as a center server.

The user terminal 2 includes, for example, a navigation device installed in the user vehicle SV, or a mobile device such as a smartphone, a mobile phone, a wearable device, or a tablet. As an alternative example, the user terminal 2 may be a general purpose device such as a PC, or a dedicated device. The term "PC" is an abbreviation of personal computer.

The operator terminal 3 includes, for example, a navigation device installed in the power supply vehicle SV, or a mobile device such as a smartphone, a mobile phone, a wearable device, or a tablet. As an alternative example, the operator terminal 3 may be a general purpose device such as a PC, or a dedicated device.

Figure 2:
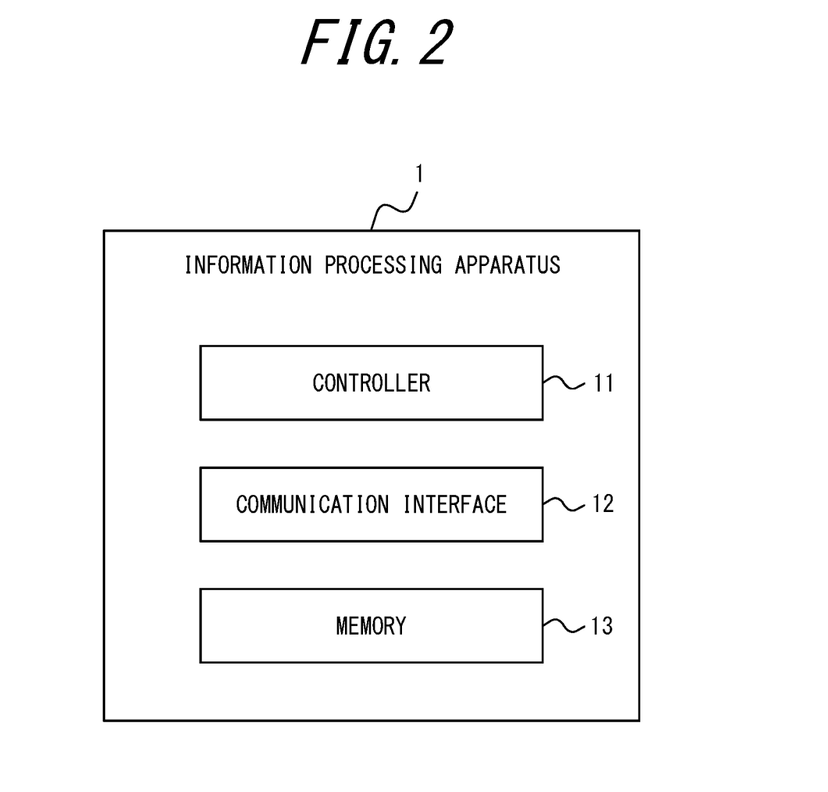
FIG. 2 is a block diagram illustrating a configuration of an information processing apparatus.

With reference to FIG. 2, an internal configuration of the information processing apparatus 1 will be described in detail.

The information processing apparatus 1 includes a controller 11, a communication interface 12, and a memory 13. The components of the information processing apparatus 1 are communicably connected to one another via, for example, dedicated lines.

The controller 11 includes, for example, one or more general purpose processors including a Central Processing Unit (CPU) or a Micro Processing Unit (MPU). The controller 11 may include one or more dedicated processors that are dedicated to specific processing. The controller 11 may include one or more dedicated circuits instead of the processors. Examples of the dedicated circuits may include a Field-Programmable Gate Array (FPGA) and an Application Specific Integrated Circuit (ASIC). The controller 11 may include an Electronic Control Unit (ECU). The controller 11 transmits and receives any information via the communication interface 12.

The communication interface 12 includes one or more communication modules for connection to the network NW that conform to wired or wireless Local Area Network (LAN) standards. The communication interface 12 may include a module conforming to one or more mobile communication standards including the Long Term Evolution (LTE) standard, the 4th Generation (4G) standard, or the 5th Generation (5G) standard. The communication interface 12 may include one or more communication modules conforming to near field communication standards or specifications, including Bluetooth® (Bluetooth is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. The communication interface 12 transmits and receives any information via the network NW.

The memory 13 includes, for example, a semiconductor memory, a magnetic memory, an optical memory, or a combination of at least two of these, but is not limited to these. The semiconductor memory is, for example, RAM or ROM. The RAM is, for example, SRAM or DRAM. The ROM is, for example, EEPROM. The memory 13 may function as, for example, a main memory, an auxiliary memory, or a cache memory. The memory 13 may store information resulting from analysis or processing performed by the controller 11. The memory 13 may store various types of information or the like regarding operations and control of the information processing apparatus 1. The memory 13 may store a system program, an application program, embedded software, and the like. The memory 13 may be provided outside the information processing apparatus 1 and accessed by the information processing apparatus 1. The memory 13 includes a vehicle information DB (database), a reservation information DB, and a business information DB. As an alternative example, these DBs may be divided into a vehicle management server, a reservation management server, and an event person server.

Figure 3:
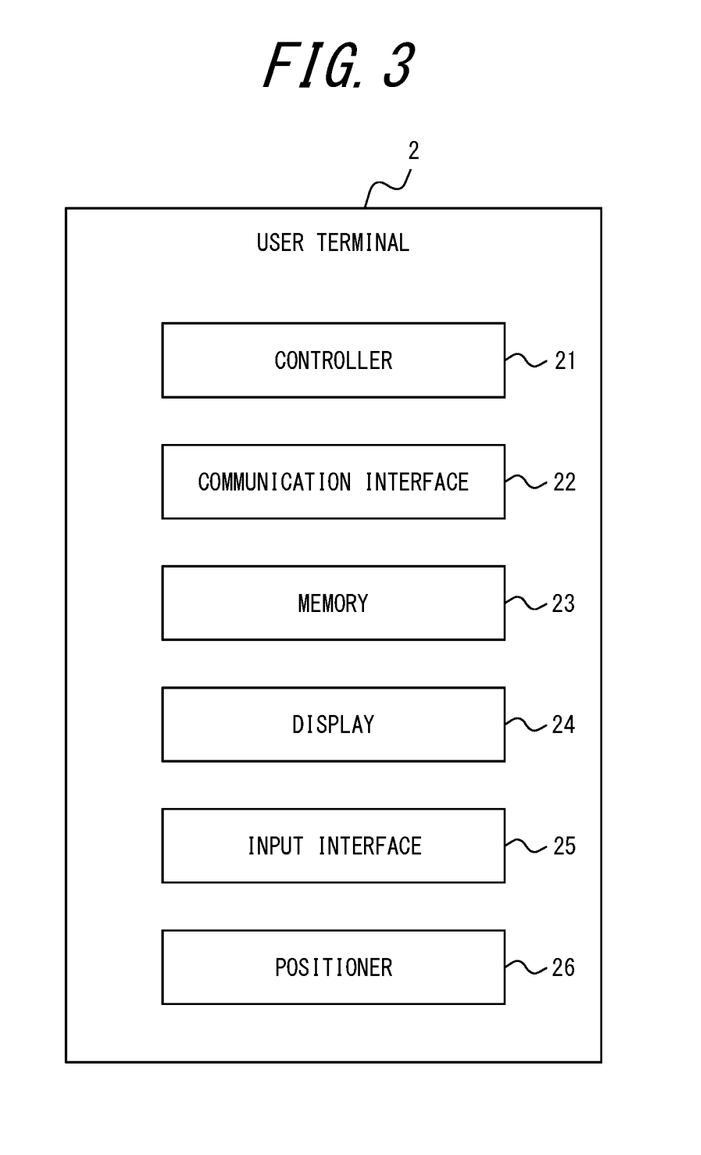
FIG. 3 is a block diagram illustrating a configuration of a user terminal.

With reference to FIG. 3, an internal configuration of the user terminal 2 will be described in detail.

The user terminal 2 includes a controller 21, a communication interface 22, a memory 23, a display 24, an input interface 25, and a positioner 26. The components of the user terminal 2 are communicably connected to one another, for example, via dedicated lines.

Descriptions of the hardware configurations of the controller 21, the communication interface 22, and the memory 23 of the user terminal 2 may be the same as the descriptions of the hardware configurations of the controller 11, the communication interface 12, and the memory 13 of the information processing apparatus 1, respectively. An explanation here is omitted.

The display 24 is, for example, a display. The display is, for example, an LCD or an organic EL display. The term "LCD" is an abbreviation of liquid crystal display. The term "EL" is an abbreviation of electro luminescence. The display 24, instead of being included in the user terminal 2, may be connected to the user terminal 2 as an external output device. As a connection method, any technology such as USB, HDMI® (HDMI is a registered trademark in Japan, other countries, or both), or Bluetooth® can be used.

The input interface 25 is, for example, a physical key, a capacitive key, a pointing device, a touch screen integrally provided with a display, or a microphone. The input interface 25 accepts an operation for inputting information to be used for the operations of the user terminal 2. The input interface 25, instead of being included in the user terminal 2, may be connected to the user terminal 2 as an external input device. As a connection method, any technology such as USB, HDMI® (HDMI is a registered trademark in Japan, other countries, or both), or Bluetooth® can be used. The term "USB" is an abbreviation of Universal Serial Bus. The term "HDMI®" is an abbreviation of High-Definition Multimedia Interface.

The positioner 26 includes at least one GNSS receiver. The term "GNSS" is an abbreviation of global navigation satellite system. GNSS includes, for example, GPS, QZSS, BeiDou, GLONASS, and/or Galileo. The term "GPS" is an abbreviation of Global Positioning System. The term "QZSS" is an abbreviation of Quasi-Zenith Satellite System. QZSS satellites are called quasi-zenith satellites. The term "GLONASS" is an abbreviation of Global Navigation Satellite System. The positioner 26 acquires positional information. The "positional information" is information that can identify the position of the user terminal 2, and includes, for example, coordinates.

Figure 4:
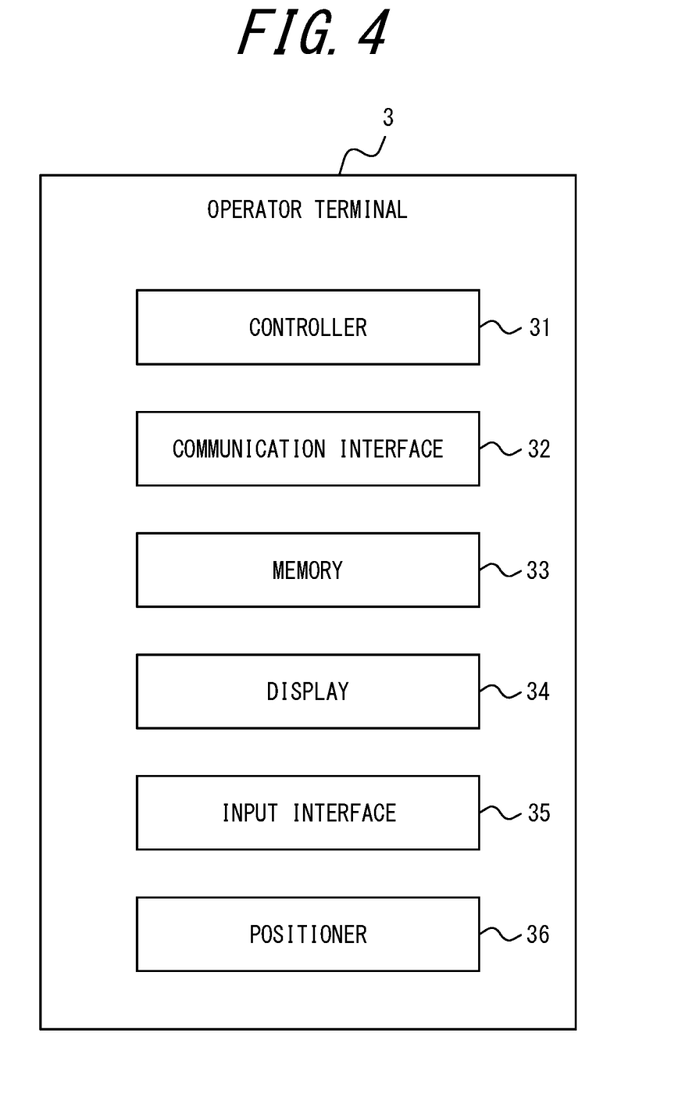
FIG. 4 is a block diagram illustrating a configuration of an operator terminal.

With reference to FIG. 4, an internal configuration of the operator terminal 3 will be described in detail.

The operator terminal 3 includes a controller 31, a communication interface 32, a memory 33, a display 34, an input interface 35, and a positioner 36. The components of the operator terminal 3 are communicably connected to one another, for example, via dedicated lines.

Descriptions of the hardware configurations of the controller 31, the communication interface 32, the memory 33, the display 34, the input interface 35, and the positioner 36 of the operator terminal 3 may be the same as the descriptions of the hardware configurations of the controller 21, the communication interface 22, the memory 23, the display 24, the input interface 25, and the positioner 26 of the user terminal 2, respectively. An explanation here is omitted.

Figure 5:
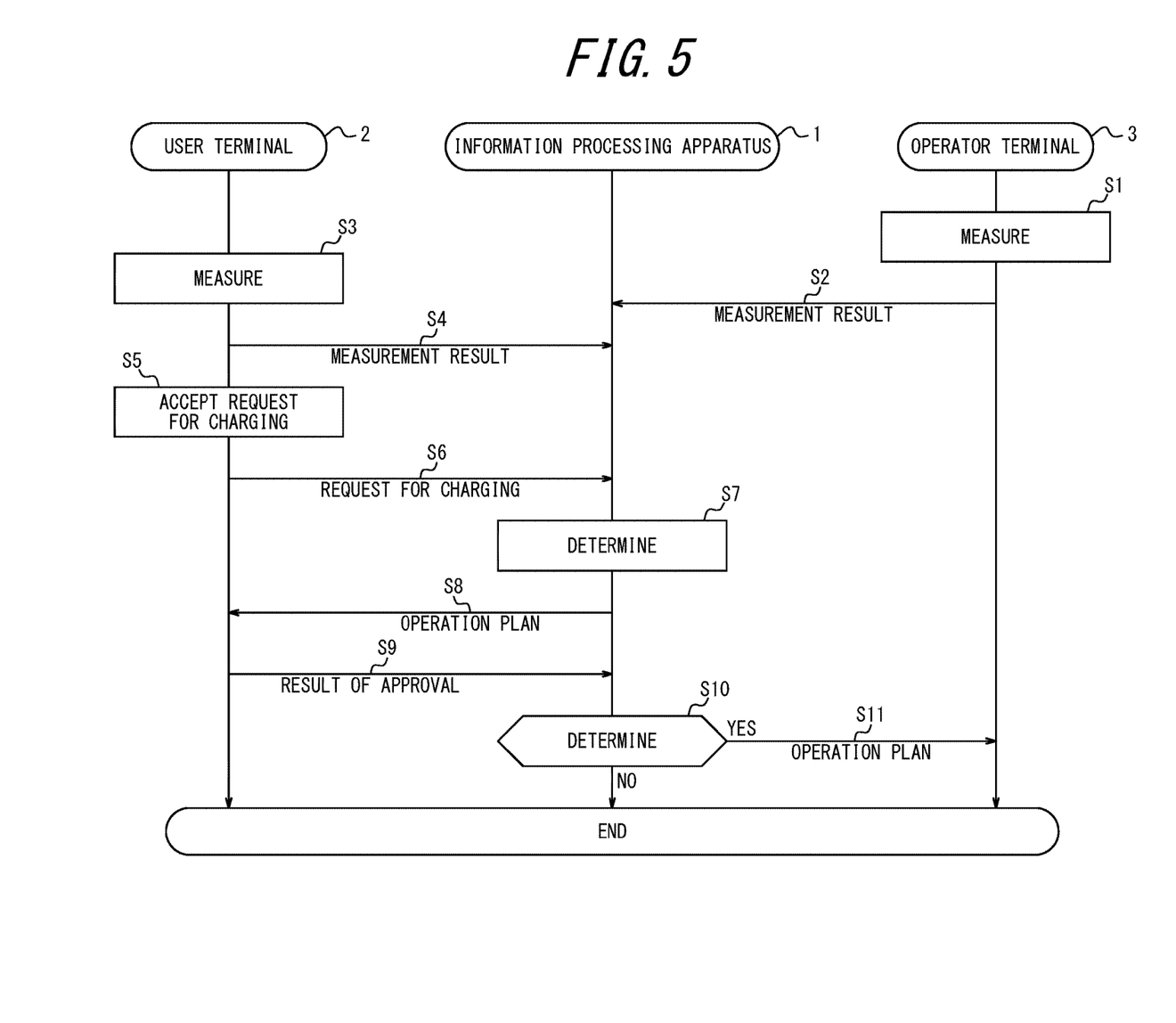
FIG. 5 is a sequence diagram illustrating operations of the information processing system.

Hereinafter, a service performed by the information processing system S according to the present embodiment will be described in detail with reference to the sequence diagram in FIG. 5. As an example, this section describes a service that transports a user SP and a user vehicle SV to a destination while supplying power to the user vehicle SV upon receipt of a reservation for a run-of-the-mill charging service from the user SP. The service may be provided via an application installed on the user terminal 2 and the operator terminal 3, or via a web browser on the user terminal 2 and the operator terminal 3.

In step S1, the positioner 36 of the operator terminal 3 measures positional information periodically or irregularly. At step S2, the controller 31 can periodically or irregularly transmit the power supply vehicle information to the information processing apparatus 1 as a measurement result. The power supply vehicle information is arbitrary information about the power supply vehicle BV and includes, for example, the measured positional information for the power supply vehicle BV, the feeding capacity of the power supply vehicle BV, and the power supply vehicle identifier. The controller 11 of the information processing apparatus 1 can receive the power supply vehicle information. The controller 11 can store the received power supply vehicle information in the vehicle information DB in the memory 13 by associating it with the power supply vehicle identifier. The vehicle information DB is a DB that stores arbitrary information about each vehicle, including positional information and remaining power supply or remaining charge capacity, for the power supply vehicle BV and the user vehicle SV, which will be described later. The controller 11 can monitor the positional information for the power supply vehicle BV and the power supply capacity. As an alternative example, the controller 31 of the operator terminal 3 may transmit the power supply vehicle information to the controller 11 when the controller 11 receives the request for charging described below.

In step S3, the positioner 26 of the user terminal 2 measures positional information periodically or irregularly. In step S4, the controller 21 can periodically or irregularly transmit user vehicle information to the information processing apparatus 1 as a measurement result. User vehicle information is any information about the user vehicle SV, including, for example, the measured positional information for the user vehicle SV, the remaining charge of the user vehicle SV, and the user vehicle identifier. The controller 11 of the information processing apparatus 1 can receive user vehicle information. The controller 11 can store the received user vehicle information in the vehicle information DB in the memory 13 by associating it with the user vehicle identifier. The controller 11 can monitor the positional information for the user vehicle SV and the remaining charge. As an alternative example, the controller 21 of the user terminal 2 may transmit the user vehicle information to the controller 11 along with the request for charging, which is described below.

In step S5, when the user SP in the user vehicle SV is unable to move due to a power shortage on the way to the desired destination, he/she selects or inputs a request for charging as a reservation for the rush charging service via the input interface 25 of the user terminal 2. The request for charging includes information indicating the destination and a user vehicle identifier. As an additional example, the request for charging can further include the location of the user vehicle SV and the remaining charge of the user vehicle SV. As an additional example, the request for charging can further include optional user preference information, such as the type of power supply vehicle BV or desired transit point to the destination. As an alternative example, the request for charging may be selected or entered when the user SP determines that the user vehicle SV is likely to be unable to move due to a power loss (i.e., before the user vehicle SV is unable to move due to a power loss). The controller 21 of the user terminal 2 accepts the request for charging.

In Step S6, the controller 21 of the user terminal 2 transmits the request for charging to the information processing apparatus 1. The controller 11 of the information processing apparatus 1 receives a request for charging from the user terminal 2. As an additional example, the controller 11 may register the request for charging as unprocessed data in the reservation information DB in the memory 13 by associating it with the user vehicle identifier. The reservation information DB is a DB that stores past and current requests for charging. In other words, the reservation information DB holds the past history of rush charging service and reservation information. As an alternative example, the controller 11 may acquire the power supply vehicle information from the operator terminal 3 when the request for charging is received, as described above.

In step S7, the controller 11 determines an operation plan for the power supply vehicle BV that includes transporting the user SP and the user vehicle SV to the destination while feeding power to the user vehicle SV in response to the request for charging. Determining the operation plan includes, for example, determining a route for the power supply vehicle BV to move to the location of the user vehicle SV and transport the user vehicle SV and the user SP to the destination, based on information indicating the location of the user vehicle SV and the destination of the user SP and the location of the power supply vehicle BV. As an additional example, determining the operation plan includes determining the route based further on user preference information, such as desired transit stops to the destination.

As an additional example, the operation plan may include terminating power supply and transportation to the user vehicle SV at a point in time when the user vehicle SV being transported while receiving power supply from the power supply vehicle BV becomes able to travel by self-propulsion the remaining route to its destination. The controller 11 can, for example, calculate or predict the amount of charge required by the user vehicle SV to reach its destination from its location based on the fuel efficiency of the user vehicle SV, the speed of supplying power to the user vehicle SV from the power supply vehicle BV, and the route and required time to the destination. The controller 11 can further determine the location on the route where the user vehicle SV becomes able to travel by self-propulsion, by calculating or predicting the required time for the user vehicle SV to be supplied with power up to the calculated or predicted charge level. In this case, determining the operation plan includes, for example, based on the positional information for the user vehicle SV, the location on the route where the user vehicle SV becomes able to travel by self-propulsion and the positional information for the power supply vehicle BV, determining the route where the power supply vehicle BV moves to the location of the user vehicle SV to transport the user vehicle SV and the user SP to the location on the route where the user vehicle SV can drive itself The route includes determining a route to transport the user vehicle SV and the user SP to a location on the route where the user vehicle SV can drive itself.

As an additional example, the controller 11 can determine the power supply vehicle BV in response to a request for charging. The determination of the power supply vehicle BV is based on, for example, but not limited to
- User preference information such as type of power supply vehicle BV (e.g., mounted or towed).
- Whether the specification of the user vehicle SV and the specification of the power supply vehicle BV are compatible with respect to the specification of charging.
- Whether the power supply vehicle BV is available or not based on the registration information in the operator information DB described below.
- The amount of charge required by the user vehicle SV (specifically, consider the case where there is a power supply vehicle CV that has less power supply capacity but is closer to the location of the user vehicle SV compared to the power supply vehicle DV, and a power supply vehicle DV that has enough power supply capacity but is farther away from the location of the user vehicle SV compared to the power supply vehicle CV. If the controller 11 determines that the amount of charge required by the user vehicle SV for the power supply vehicle CV is insufficient for the power supply vehicle CV's power supply capacity, the power supply vehicle CV is not determined as the power supply vehicle BV. Next, if the controller 11 determines that the amount of charge required by the user vehicle SV is sufficient to meet the power supply capacity of the power supply vehicle DV, the power supply vehicle DV is determined as the power supply vehicle BV).

As an additional example, the controller 11 may register the determined information about the power supply vehicle BV in the operator information DB in the memory 13 by associating it with the power supply vehicle identifier. The operator information DB is a DB that stores arbitrary information about the power supply vehicle BV, such as the type or usage status of the power supply vehicle BV.

As an additional example, in step S8, the controller 11 transmits the operation plan to the user terminal 2. When the controller 21 of the user terminal 2 receives the operation plan, it displays the operation plan on the display 24. The controller 21 can accept approval of the operation plan by the user SP via the input interface 25. At step S9, the controller 21 can transmit the result of approval by the user SP to the information processing apparatus 1. The controller 11 of the information processing apparatus 1 can receive the result of approval. In step S10, the controller 11 determines whether the user SP has approved the operation plan. If the result of approval indicates that the user SP has approved the operation plan, the controller 11 proceeds to step S11 described below. As an additional example, if the result of approval indicates that the user SP has approved the operation plan, the controller 11 can register information about the user-approved operation plan in the reservation information DB and the operator information DB in the memory 13 in association with the user vehicle identifier or the power supply vehicle identifier.

As an alternative example, the controller 11 can transmit multiple candidates for the operation plan to the user terminal 2. The candidate routes included in each operation plan are determined based on, for example, but not limited to Whether or not to use toll roads.

The power supply vehicle BV transports the user vehicle SV and the user SP to the destination, or the power supply vehicle BV transports the user vehicle SV and the user SP to the point in time when the user vehicle SV becomes able to travel by self-propulsion.

Multiple routes to a destination with the same arrival time.

When the controller 11 transmits multiple candidate routes to the user terminal 2, the controller 21 can accept the user SP's selection of the desired candidate route via the input interface 25.

In step S11, the controller 11 transmits the operation plan to the operator terminal 3. When the controller 31 of the operator terminal 3 receives the operation plan, it can display the operation plan on the display 34. The operator BP may operate the power supply vehicle BV according to the operation plan. As an alternative example, the controller 11 may transmit to the operator terminal 3 an operation plan to operate the power supply vehicle in automatic operation.

As described above, according to the present embodiment, the operation of the controller 11 of the information processing apparatus 1 includes: receiving a request for charging including information indicating a destination from the user terminal 2; transporting the user SP and the user vehicle SV toward the destination while supplying power to the user vehicle SV in response to the request for charging determining an operation plan for the power supply vehicle BV, and transmitting the operation plan to the operator terminal 3. This configuration allows the information processing apparatus 1 to reduce the possible adverse effects on the subsequent schedule of the user SP even after the user vehicle SV is unable to move due to lack of electricity.

According to the present embodiment, the operation plan also includes terminating power supply and transportation to the user vehicle SV at the point in time when the user vehicle SV, which is being transported while receiving power supply from the power supply vehicle BV, becomes able to travel by self-propulsion the remaining route to its destination. Compared to travel by the power supply vehicle BV, travel by the user vehicle SV can reach the destination faster. The above configuration allows the information processing apparatus 1 to further reduce the possible adverse effects on the subsequent schedule of the user SP.

According to the present embodiment, the operation of the controller 11 also includes determining the point in time when the user vehicle SV becomes able to travel by self-propulsion, based on the fuel efficiency of the user vehicle SV, the speed of supplying power to the user vehicle SV from the power supply vehicle BV, and the route and the required time to the destination. This configuration allows the information processing apparatus 1 to more accurately calculate or predict the point in time when the user vehicle SV becomes able to travel by self-propulsion.

According to the present embodiment, the operation of the controller 11 includes transmitting the operation plan to the user terminal 2 and receiving from the user terminal 2 the user SP's result of approval for the operation plan. This configuration allows the information processing apparatus 1 to implement an operation plan in accordance with the intentions of the user SP.

While the present disclosure has been described with reference to the drawings and examples, it should be noted that various modifications and revisions may be implemented by those skilled in the art based on the present disclosure. Other modifications can be made without departing from the spirit of the present disclosure. For example, functions or the like included in each means or each step can be rearranged without logical inconsistency, and a plurality of means or steps can be combined into one or divided.

For example, in the aforementioned embodiment, a program configured to execute all or some of the functions or processing of the information processing apparatus 1 can be recorded on a computer readable recording medium. The computer readable recording medium includes a non-transitory computer readable medium and is, for example, a magnetic recording apparatus, an optical disc, a magneto-optical recording medium, or a semiconductor memory. The program is distributed, for example, by selling, transferring, or lending a portable recording medium such as a Digital Versatile Disc (DVD) or a Compact Disc Read Only Memory (CD-ROM) on which the program is recorded. The program may also be distributed by storing the program in a storage of any server and transmitting the program from any server to another computer. The program may be provided as a program product. The present disclosure can also be implemented as a program executable by a processor.

A computer temporarily stores in a main memory, for example, the program recorded on the portable recording medium, or the program transferred from the server. Then, the computer reads the program stored in the main memory using a processor, and executes processes in accordance with the read program using the processor. The computer may read the program directly from the portable recording medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. The program encompasses information that is to be used for processing by an electronic computer and is thus equivalent to a program. For example, data that is not a direct command to a computer but has a property that regulates processing of the computer is "equivalent to a program" in this context.

The invention claimed is:

1. An information processing method performed by an information processing apparatus, the information processing method comprising:
   receiving, periodically from a user terminal, a request for charging that includes information indicating a destination and positional information of a user vehicle;
   receiving, periodically from an operator terminal, positional information of a power supply vehicle;
   determining an operation plan of the power supply vehicle (i) to determine a route to cause the power supply vehicle to move to a location of the user vehicle and transport a user riding in the user vehicle and the user vehicle to the destination based on the positional information of the user vehicle, the information indicating the destination and the positional information of the power supply vehicle, thereby causing the power supply vehicle to transport the user and the user vehicle toward the destination with supplying power to the user vehicle and (ii) to determine a point in time when the user vehicle, which is transported with receiving the power supplied from the power supply vehicle, becomes able to travel by self-propulsion a remaining route to the destination based on fuel efficiency of the user vehicle, speed of supplying power to the user vehicle from the power supply vehicle, and the route and required time to the destination, thereby causing the power supply vehicle to terminate power supply and transportation for the user vehicle at the point in time when the user vehicle becomes able to travel by self-propulsion in response to the request for charging; and
   transmitting the operation plan to the operator terminal, wherein the power supply vehicle comprises a power supplying function to supply power to the user vehicle and a transportation function to transport the user and the user vehicle.

2. The information processing method according to claim 1, further comprising determining the power supply vehicle if the power supply vehicle has an amount of charge required by the user vehicle and is located closest to the location of the user vehicle compared with other power supply vehicles in response to the request for charging.

3. The information processing method according to claim 1, further comprising:
   transmitting the operation plan to the user terminal; and
   receiving a result of approval of the user for the operation plan from the user terminal.

* * * * *